(12) United States Patent
Wakana

(10) Patent No.: US 9,424,501 B2
(45) Date of Patent: Aug. 23, 2016

(54) INFORMATION PROCESSING DEVICE CAPABLE OF OUTPUTTING PRINT DATA TO PRINT DEVICE, AND CONTROL METHOD THEREOF

(71) Applicant: CANON KABUSHIKI KAISHA, Tokyo (JP)

(72) Inventor: Toru Wakana, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/276,387

(22) Filed: May 13, 2014

(65) Prior Publication Data

US 2014/0240784 A1 Aug. 28, 2014

Related U.S. Application Data

(63) Continuation of application No. 13/426,351, filed on Mar. 21, 2012, now Pat. No. 8,760,698, which is a continuation of application No. 11/220,182, filed on Sep. 6, 2005, now abandoned.

(30) Foreign Application Priority Data

Sep. 7, 2004 (JP) ................................. 2004-259907

(51) Int. Cl.
*G06F 3/12* (2006.01)
*G06K 15/00* (2006.01)
*H04N 1/00* (2006.01)

(52) U.S. Cl.
CPC ........ *G06K 15/4005* (2013.01); *H04N 1/00127* (2013.01); *H04N 1/00204* (2013.01); *H04N 1/00278* (2013.01); *H04N 2201/001* (2013.01); *H04N 2201/0039* (2013.01); *H04N 2201/0094* (2013.01)

(58) Field of Classification Search
USPC ........................................................ 358/1.13
See application file for complete search history.

(56) References Cited

U.S. PATENT DOCUMENTS

| | | | |
|---|---|---|---|
| 6,124,942 | A | 9/2000 | Ichinowatari |
| 6,757,698 | B2 | 6/2004 | McBride et al. |
| 6,945,717 | B2 | 9/2005 | Hata et al. |
| 7,019,854 | B1 | 3/2006 | Sawano |
| 7,317,550 | B2 | 1/2008 | Lester et al. |
| 7,369,263 | B2 | 5/2008 | Azami |
| 2001/0006585 | A1 | 7/2001 | Horigane |

(Continued)

FOREIGN PATENT DOCUMENTS

| | | | |
|---|---|---|---|
| JP | 10-308868 A | | 11/1998 |
| JP | 11105381 A | * | 4/1999 |

*Primary Examiner* — Huo Long Chen
(74) *Attorney, Agent, or Firm* — Rossi, Kimms & McDowell LLP

(57) ABSTRACT

In case of searching and outputting output information stored in a memory, it enables a user of the host computer to select the device of storing the output information, whereby the load in searching and outputting the information is reduced. To do so, when the host computer causes the printer to print the image based on the print data, the hard disk of the multifunctional device is selected from among the plural hard disks, as the storage destination to which the print data is stored and from which the stored print data can be searched and output. Then, the information representing the storage destination and the print data are transmitted to the printer so as to be printed, and the print data is also transmitted to the multifunctional device to be stored.

6 Claims, 11 Drawing Sheets

(56) References Cited

U.S. PATENT DOCUMENTS

| | | |
|---|---|---|
| 2003/0041097 A1 | 2/2003 | Tormasov |
| 2003/0115326 A1* | 6/2003 | Verma et al. .................. 709/225 |
| 2004/0015992 A1 | 1/2004 | Hasegawa et al. |
| 2004/0027604 A1 | 2/2004 | Jeran et al. |
| 2004/0032614 A1 | 2/2004 | Tanaka et al. |
| 2004/0046987 A1* | 3/2004 | Mima ................ H04N 1/00244 358/1.14 |
| 2004/0100652 A1 | 5/2004 | Cooper |
| 2004/0143566 A1* | 7/2004 | Fukasawa ........................ 707/1 |
| 2004/0156070 A1* | 8/2004 | Gassho ........................ 358/1.14 |
| 2004/0160623 A1 | 8/2004 | Strittmatter et al. |
| 2005/0046886 A1 | 3/2005 | Ferlitsch |
| 2006/0050308 A1 | 3/2006 | Wakana |

\* cited by examiner

| ADDRESS OF TRANSMISSION DESTINATION (1101) | ADDRESS OF TRANSMISSION SOURCE (1102) | COMMAND (1103) |
|---|---|---|
| STORAGE LOCATION (1104) | FILE NAME (1105) | |

| ADDRESS OF TRANSMISSION DESTINATION (1201) | ADDRESS OF TRANSMISSION SOURCE (1202) | COMMAND (1203) |
|---|---|---|
| STORAGE LOCATION (1204) | FILE NAME (1205) | DATA FORMAT (1206) |

FIG. 15

STORAGE MEDIUM SUCH AS FD, CD-ROM OR THE LIKE

| DIRECTORY INFORMATION |
|---|
| 1ST DATA PROC PROGRAM<br>PROGRAM CODE GROUP CORRESPONDING TO<br>STEPS OF FLOW CHART SHOWN IN FIG. 3 |
| 2ND DATA PROC PROGRAM<br>PROGRAM CODE GROUP CORRESPONDING TO<br>STEPS OF FLOW CHART SHOWN IN FIG. 4 |
| 3RD DATA PROC PROGRAM<br>PROGRAM CODE GROUP CORRESPONDING TO<br>STEPS OF FLOW CHART SHOWN IN FIG. 5 |
| 4TH DATA PROC PROGRAM<br>PROGRAM CODE GROUP CORRESPONDING TO<br>STEPS OF FLOW CHART SHOWN IN FIG. 7 |
| 5TH DATA PROC PROGRAM<br>PROGRAM CODE GROUP CORRESPONDING TO<br>STEPS OF FLOW CHART SHOWN IN FIG. 9 |
| 6TH DATA PROC PROGRAM<br>PROGRAM CODE GROUP CORRESPONDING TO<br>STEPS OF FLOW CHART SHOWN IN FIG. 10 |
| 7TH DATA PROC PROGRAM<br>PROGRAM CODE GROUP CORRESPONDING TO<br>STEPS OF FLOW CHART SHOWN IN FIG. 13 |
| 8TH DATA PROC PROGRAM<br>PROGRAM CODE GROUP CORRESPONDING TO<br>STEPS OF FLOW CHART SHOWN IN FIG. 14 |
|  |

MEMORY MAP OF STORAGE MEDIUM

INFORMATION PROCESSING DEVICE CAPABLE OF OUTPUTTING PRINT DATA TO PRINT DEVICE, AND CONTROL METHOD THEREOF

CROSS-REFERENCE

This application is a continuation of U.S. patent application Ser. No. 13/426,351 filed Mar. 21, 2012, which is a continuation of U.S. patent application Ser. No. 11/220,182 filed Sep. 6, 2005, the contents of each of which are herein incorporated by reference in their entirety.

BACKGROUND OF THE INVENTION

1. Field of the Invention

The present invention relates to an information processing device which can generate and output print data to a print device through a network and also can store the print data in a storage device, and a control method which is applicable to the information processing device.

2. Related Background Art

Conventionally, the following information processing method which is applied to a digital copying machine is proposed (for example, see Japanese Patent Application Laid-Open No. H10-308868; hereinafter called the document). More specifically, in the document, a document ID is added to the original to be read by the digital copying machine, the document with the document ID added is printed and also registered in the hard disk. Then, the printed document with the document ID added is read by the digital copying machine, whereby the document registered in the hard disk is read to again execute the printing.

However, in the document, since the original is always stored in the hard disk of the digital copying machine, for example, a problem occurs in a case where the print device (i.e., the digital copying machine) by which the user prints the document is happened to be installed or put at the location which is distant from the location where the relevant user is usually acting. More specifically, in such a case, every time the stored original is extracted, it is necessary to do so through many kinds of or various routes, whereby there is a fear that the traffic unnecessarily increases.

SUMMARY OF THE INVENTION

One feature of the present invention is to provide an information processing device which can eliminate such a conventional problem or disadvantage, and the control method which is applicable to the relevant information processing device.

Another feature of the present invention is to be able to designate, on the side of the information processing device which transfers the output information to be printed by a print device, the storage destination of the relevant output information to be later extracted and used.

Still another feature of the present invention is to provide an information processing device which can reduce the load for the data transfer necessary in case of reading the output information, and the control method which is applicable to the relevant information processing device.

The above and other features of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is a view for explaining a memory map of a storage medium for storing various data processing programs which can be read by the image processing system including a host computer, the printing device and the multifunctional device according to the present invention.

DETAILED DESCRIPTION OF THE PREFERRED EMBODIMENTS

Hereinafter, the best mode for carrying out the present invention will be explained with reference to the attached drawings.

First Embodiment

<Explanation of System Construction>

Figure 1:
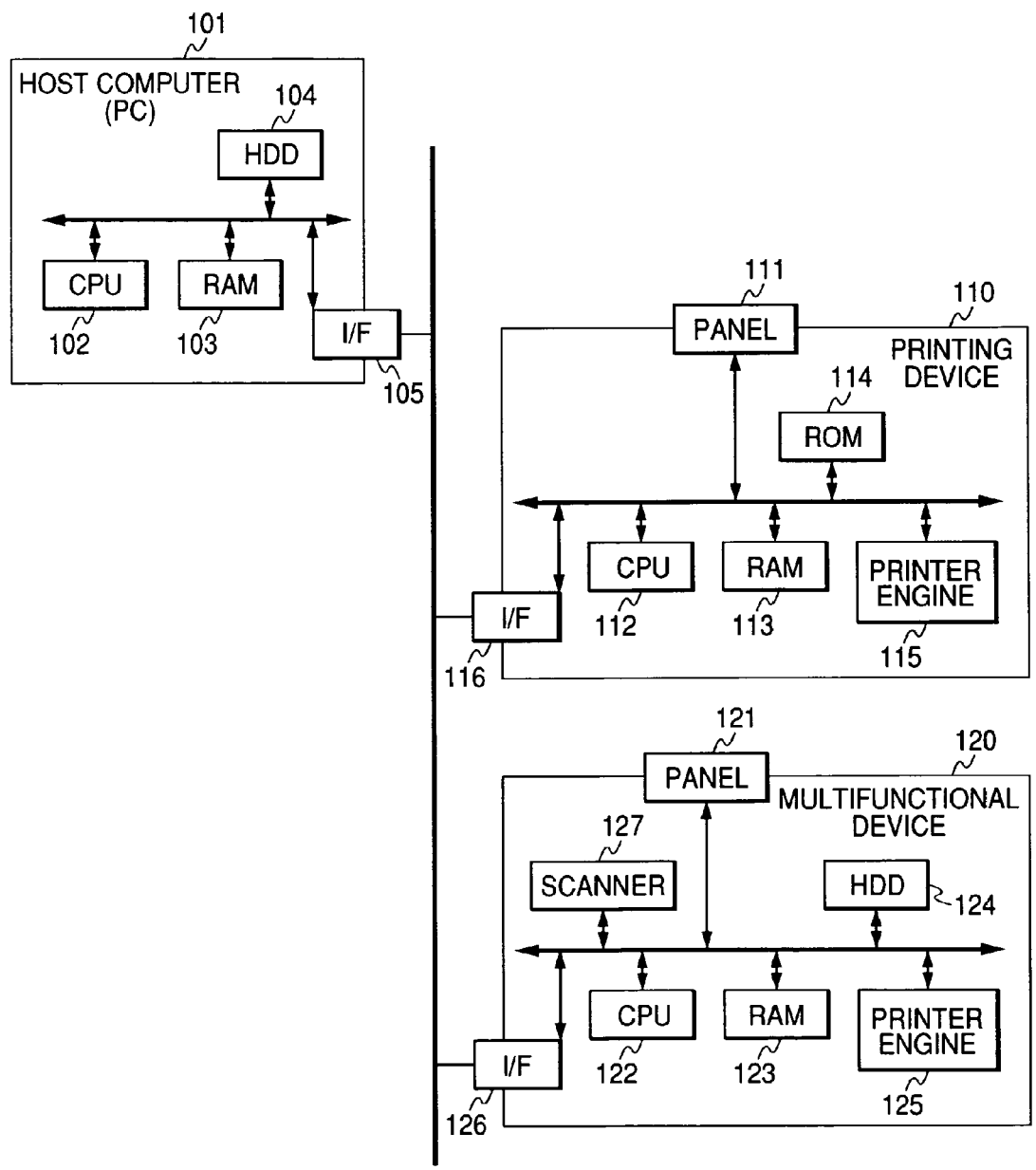
FIG. 1 is a block diagram showing an example of an image processing system including an information processing device and an image output device indicating the first embodiment of the present invention.

FIG. 1 is a block diagram showing an example of an image processing system including a host computer, a printing device and an image storage device indicating the first embodiment of the present invention.

In FIG. 1, reference numeral 101 denotes a host computer (PC), which generates print data (PDL (page description language) data) used for executing a print process by using printer driver at a printing device from document data or image data created by application software and can output the generated print data through a network. Reference numeral 102 denotes a CPU (central processing unit), and all the software functioning on the host computer to be explained in the drawings after FIG. 2 functions on the CPU 102. Reference numeral 103 denotes a RAM (random access memory), which is used by the software functioning on the CPU 102 for the sake of data storage or an operation of the own software. Reference numeral 104 denotes a HDD (hard disk drive), which stores the software and the like. Reference numeral 105 denotes a communication interface.

Reference numeral 110 denotes a printing device. Reference numeral 111 denotes a panel, which is used for setting an operation of the printing device 110. Reference numeral 112 denotes a CPU, and all the software functioning on the printing device to be explained in the drawings after FIG. 2 functions under the control of the CPU 112. Reference numeral 113 denotes a RAM, which is used by the software functioning on the CPU 112 for the sake of data storage or an operation of the own software. Reference numeral 114 denotes a ROM (read only memory), which sores the software and the like. Reference numeral 115 denotes a printer engine, which executes a print process of an image created by the software functioning on the CPU 112. Reference numeral 116 denotes a communication interface.

Reference numeral 120 denotes a multifunctional device. Reference numeral 121 denotes a panel, which is used for setting an operation of the multifunctional device 120. Reference numeral 122 denotes a CPU, and all the software functioning on the multifunctional device to be explained in the drawings after FIG. 2 functions under the control of the CPU 122. Reference numeral 123 denotes a RAM, which is used by the software functioning on the CPU 122 for the sake of data storage or an operation of the own software.

Reference numeral 124 denotes an HDD, which stores image data, software and the like. Reference numeral 125 denotes a printer engine, which executes a print process of an image created by the software functioning on the CPU 122. Reference numeral 126 denotes a communication interface. Reference numeral 127 denotes a scanner, which acquires digital images from the prints.

Figure 2:
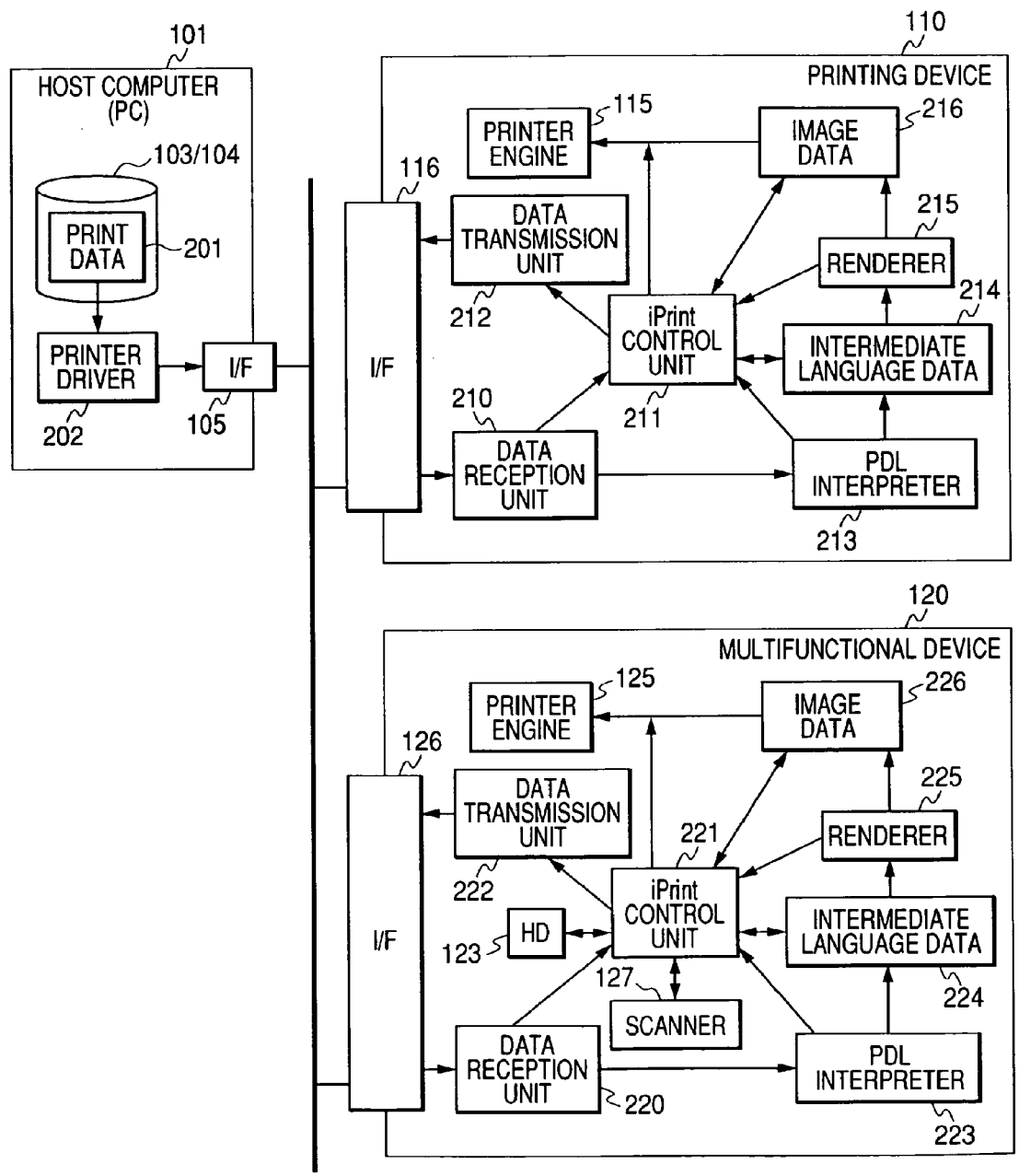
FIG. 2 is a block diagram for explaining the construction of software modules in the image processing system shown in FIG. 1.

FIG. 2 is a block diagram for explaining the construction of software modules in the image processing system shown in FIG. 1.

In the host computer 101 shown in FIG. 2, reference numeral 201 denotes print data, which is held by the RAM 103 or the HDD 104. Reference numeral 202 denotes a printer driver, which is used when printing the print data 201.

Reference numeral 210 denotes a data reception unit, which analyzes data received by the communication interface 116 and determines a transfer destination of the received data on the basis of an analyzed result. Reference numeral 211 denotes an iPrint control unit, which carries out a main role of the present invention. In the present embodiment, the "iPrint" is defined as a process, where in case of printing print data generated by the host computer by using the printing device, the print data is stored into a predetermined storage device, and the printing device is caused to execute a print process with a state of adding a discrimination ID indicating a storage location of the print data, then the printed output matter is read by the scanner so as to analyze the discrimination ID thereby enabling the printing device to execute a print process again on the basis of the print data stored in the storage device. Detailed functions will be indicated in flowcharts in the drawings after FIG. 3.

Reference numeral 212 denotes a data transmission unit, which transmits inquiry data from the iPrint control unit 211 to another printing device within a network. Reference numeral 213 denotes a PDL interpreter, which interprets the received print data. Within the PDL interpreter 213, there exists PDL such as PostScript, LIPS (LBP image processing system) or the like. Reference numeral 214 denotes intermediate language data, which is in a state that it can be interpreted by the printing device by interpreting data of PDL portion in the PDL interpreter 213. Reference numeral 215 denotes a Renderer, which generates bit-map developed image data 216 by treating the intermediate language data 214 as input data.

In the multifunctional device 120 shown in FIG. 2, reference numeral 220 denotes a data reception unit, which analyzes data received by the communication interface unit 126 and determines a transfer destination of the received data on the basis of an analyzed result. Reference numeral 221 denotes an iPrint control unit, which controls a process for the iPrint. Detailed functions will be indicated in flowcharts shown in the drawings after FIG. 3. Reference numeral 222 denotes a data transmission unit, which transmits inquiry data from the iPrint control unit 221 to another printing device within a network. Reference numeral 223 denotes a PDL interpreter, which interprets the received print data. Within the PDL interpreter 223, there exists PDL such as the PostScript, the LIPS or the like. However it is not required that the PDL interpreter 223 is same as the PDL interpreter in the printing device 110. Reference numeral 224 denotes intermediate language data, which is in a state that it can be interpreted by the printing device by interpreting data of PDL portion in the PDL interpreter 223. Reference numeral 225 denotes a Renderer, which generates bit-map developed image data 226 by treating the intermediate language data 224 as input data.

In FIGS. 1 and 2, only the host computer, the printing device and the multifunctional device are shown, however in the present system, other devices such as plural printing devices, multifunctional devices, storage devices and host computers can be connected.

At first, a method of executing an iPrint process will be explained using a flowchart shown in FIG. 3.

Figure 3:
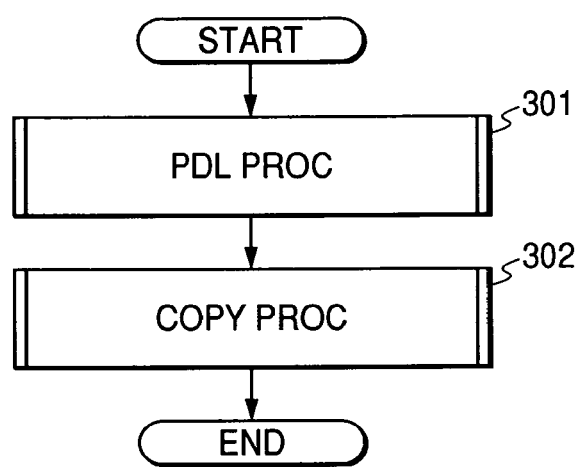
FIG. 3 is a flowchart showing an example of a first data processing procedure in the image processing system according to the present invention.

FIG. 3 is a flowchart showing an example of a first data processing procedure in the image processing system according to the present embodiment, and this procedure corresponds to a basic processing procedure for executing the iPrint process in the present system. Reference numerals (301) and (302) denote respective steps.

Initially, in the step (301), a PDL process is executed in the printing device 110 or the like shown in FIG. 1. Thereafter, in the step (302), a copy process is executed to the PDL processed result (printed matter) obtained in the step (301) and then the iPrint process is terminated. Hereinafter, the details of the PDL process and the copy process will be respectively explained using a flowchart shown in FIG. 4 and a flowchart shown in FIG. 8.

Figure 4:
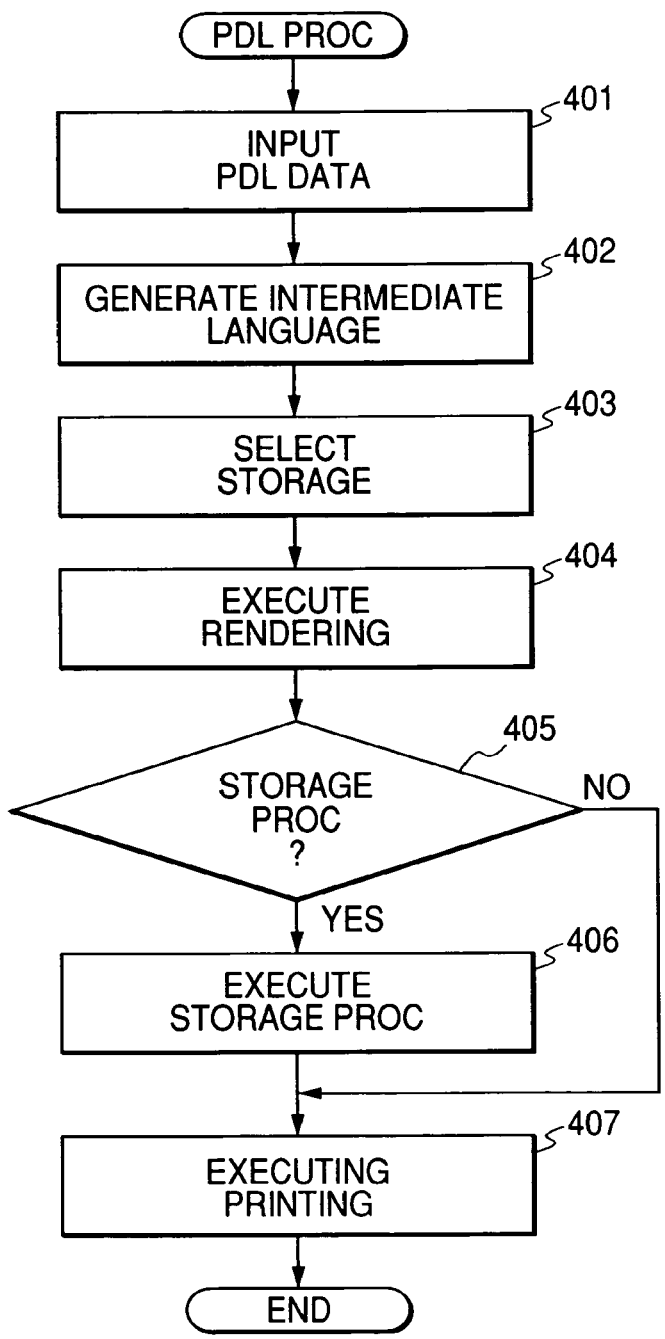
FIG. 4 is a flowchart showing an example of a second data processing procedure in the image processing system according to the present invention.

FIG. 4 is a flowchart showing an example of a second data processing procedure in the image processing system according to the present embodiment, and this procedure corresponds to a PDL processing procedure executed by the CPU 112 in the printing device 110. Reference numerals (401) to (407) denote respective steps.

Initially, in the step (401), it is started to input PDL data. More particularly, as to a generated result of the PDL data at an external terminal such as the host computer 101 or the like shown in FIG. 1, the generated PDL data is received by the data reception unit 210 shown in FIG. 2 through the I/F unit 116 shown in FIG. 1.

The PDL data in this case has to be such data which can be analyzed by the PDL interpreter 213 equipped in the printing device 110 shown in FIG. 1. In the present embodiment, kinds of PDL are not especially required.

Next, in the step (402), the PDL data received in the step (401) is analyzed at the PDL interpreter 213 shown in FIG. 2, and the intermediate language data 214 shown in FIG. 2 is generated. The intermediate language mentioned here indicates the general term of a drawing object and a background pattern such as "bit-map", "run length" "trapezoid", "box", "bit-map boundary encoded at high speed" and a drawing logic in case of drawing the drawing object and the background pattern into a raster memory. That is, this intermediate language data is a display list for indicating factors to be drawn and order thereof obtained by executing a rasterizing process to the PDL data, and since a format of the display list does not depend on kinds of PDL, a print process can be executed by various printers different in kinds of PDL.

Next, in the step (403), a storage destination is selected. The selection of storage destination means that any storage device including a storage device (storage) on a network or the inside of the printing device 110 used for storage is selected so that image data (image data or intermediate language data) generated by the PDL process before printing can be reused by a search process, and the selection is executed by the iPrint control unit 211 on the basis of designation from the host computer 101. The detail of the selection of storage destination will be described later.

Next, in the step (404), a rendering process is executed. The rendering process mentioned here indicates that the kind of object construction (for example, characters, images, figures or the like) of the intermediate language data format generated in the step (402) is analyzed and the intermediate language data generated in the step (402) is developed into bit-map data, which is stored into a designated storage area (a part of RAM 113 shown in FIG. 1) by using the Renderer 215 shown in FIG. 2.

Next, in the step (405), it is investigated whether or not a storage process (a process of storing image data into a storage device so that the image data is reused by search) is executed in the present process. As to execution of the storage process, it is judged by the iPrint control unit 211 on the basis of the result in the step (403). As the result in the step (403), when the iPrint control unit 211 judges that execution of the storage process is determined, a flow advances to the step (406), where the storage process is executed.

On the other hand, as the result in the step (403), when it is determined that the storage process is not executed, the flow advances to the step (407), where a print process is executed and then the present process is terminated. Although the detail of the print process is not especially shown, the image data 216 shown in FIG. 2 is video transferred to the printer engine 115 shown in FIG. 2 and then the print process is executed on a designated sheet. According to the above processes, the PDL process in the step (301) shown in FIG. 3 is terminated.

Figure 5:
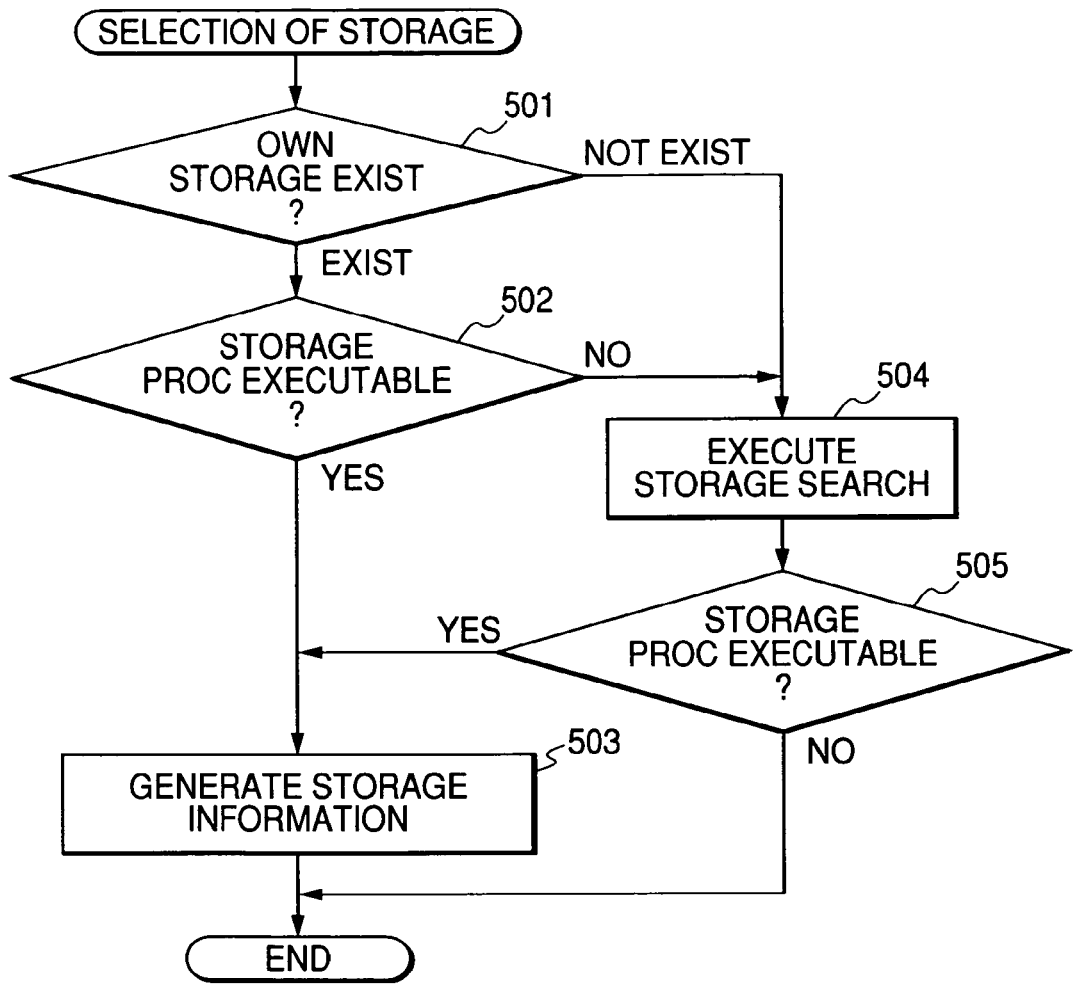
FIG. 5 is a flowchart showing an example of a third data processing procedure in the image processing system according to the present invention.

FIG. 5 is a flowchart showing an example of a third data processing procedure in the image processing system according to the present embodiment, and this procedure corresponds to a detailed procedure in a case that the storage device is not designated from the host computer 101 in the storage selection process in the step (403) shown in FIG. 4. Reference numerals (501) to (505) denote respective steps.

Initially, in the step (501), it is investigated whether or not a usable storage location exists for a device of currently processing. In case of the present embodiment, it is judged whether or not a storage location exists in the own device for the printing device 110 of currently executing the PDL process shown in FIG. 1.

When it is judged that a storage area exists in the printing device 110 shown in FIG. 1 as the storage location, a flow advances to the step (502).

On the other hand, it is judged that the storage location for storage does not exist in the printing device 110 in the step (501), the flow advances to the step (504), where a storage search process is executed.

Initially, an explanation in a case that the storage location for the device of currently processing exists in the step (501) will be given. In this case, the flow advances to the step (502), where information of number of total pages to be printed is extracted based from a result in the step (402) shown in FIG. 4, and it is investigated whether or not the storage process is executable.

For example, in case of monochrome data of which the resolution is 600 dpi and the gradation is 1 bpp, since data size per one page becomes about 4 MB, the amount of "4 MB×number of pages" is treated as the data size, which is compared with free space capacity of the storage area, then it is judged whether or not the storage process is executable. The data size per one page sometimes changes according to the resolution, the gradation and the like. Also, it is possible to reduce the data size by using an arbitrary encoding method and use that reduced sized data for a comparison with storage size.

Then, in the step (502), when it is judged that the storage process is executable at the device of currently processing, the flow advances to the step (503).

On the other hand, as a result in the step (502), when it is judged that the storage process is not executable at the device of currently processing, the flow advances to the step (504), where storage search is executed. This storage search is also executed by the iPrint control units 211 and 221 shown in FIG. 2. The detail of the storage search will be explained using a flowchart in FIG. 7.

Then, in the step (502), it is judged whether or not a response from another device indicates "storage process is executable" based from a search result obtained in the step (504). When it is judged that a response of indicating a fact that the storage process is executable is returned, the flow advances to the step (503), and when it is judged that a response of indicating a fact that the storage process is not executable is returned, a process of storage selection is terminated.

On the other hand, in the step (505), when it is judged that the storage process is executable, the flow advances to the step (503).

Next, in the step (503), storage information is generated. This process corresponds to a process of describing information into packets shown in FIG. 6 on the basis of the results in the steps (502) and (505).

Figure 6:
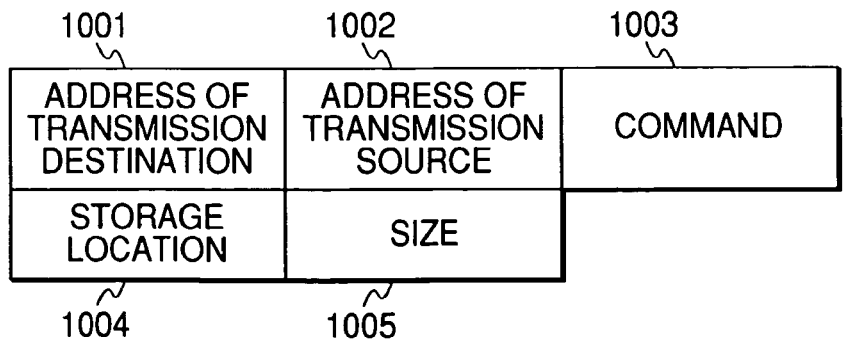
FIG. 6 is a view showing an example of search packets to be output from a printing device shown in FIG. 1 to a network.

FIG. 6 is a view showing an example of search packets to be output from the printing device 110 shown in FIG. 1 to a network.

In FIG. 6, an address of a device of storage destination is described into a packet of an address of transmission destination 1001. An address of the device (printing device) of currently executing the PDL process is described into a packet of an address of transmission source 1002. A storage search result (in this case, "storage process is executable") is described into a packet of a command 1003. A storage location (directory) in the storage device is described into a packet of a storage location 1004. Data size required in case of storing image data in the storage device is described into a packet of a size 1005.

Figure 7:
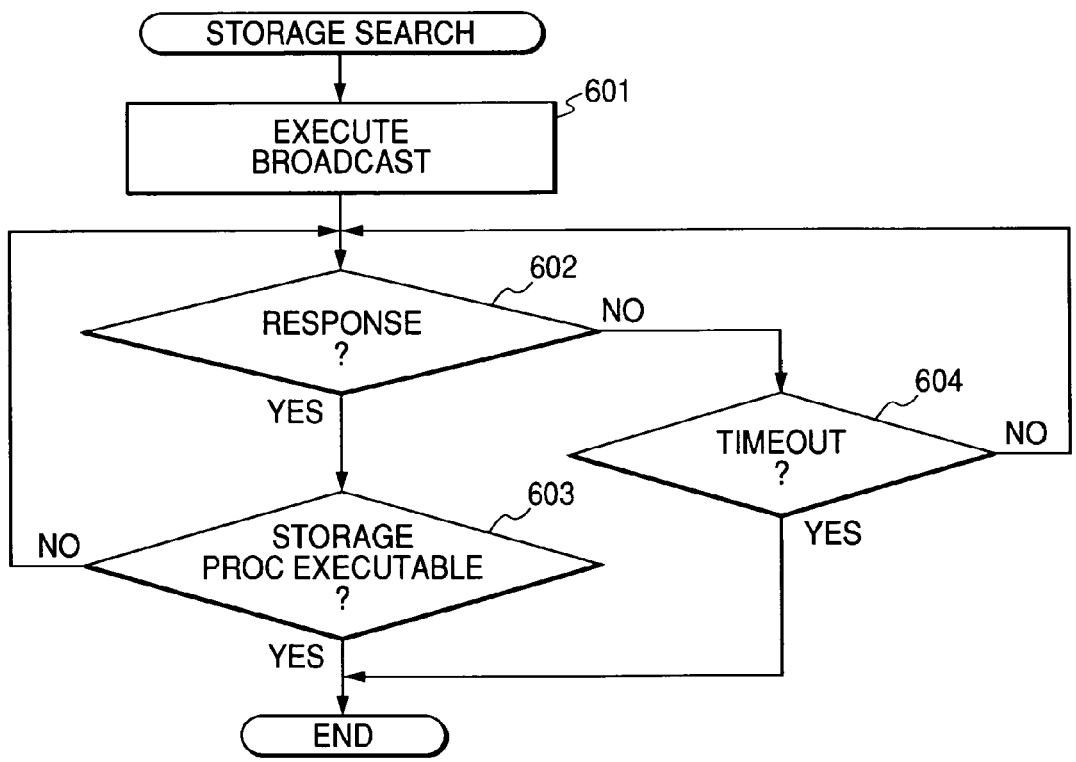
FIG. 7 is a flowchart showing an example of a fourth data processing procedure in the image processing system according to the present invention.

FIG. 7 is a flowchart showing an example of a fourth data processing procedure in the image processing system according to the present embodiment, and this procedure corresponds to a detailed procedure of storage search in the step (504) shown in FIG. 5. Reference numerals (601) to (604) denote respective steps.

The present process is an example of broadcasting storage search packets on a network.

Figure 8:
FIG. 8 is a view showing an example of packets to be output from the printing device shown in FIG. 1 to the network.

Initially, in the step (601), the data transmission unit 212 or 222 shown in FIG. 2 broadcasts packets shown in FIG. 8 on the network.

FIG. 8 is a view showing an example of packets to be output from the printing device 110 shown in FIG. 1 to the network, and these packets are used for executing the broadcast.

In FIG. 8, an address indicating an address of transmission destination is described into a packet 901, an address indicating an address of transmission source is described into a packet 902 and a command indicating "storage search" is described into a packet 903.

Next, in the step (602), it is investigated whether or not a response from the network exists to the broadcast executed in the step (601). When it is judged that the response exists, a flow advances to the step (603), and when it is judged that the response does not exist, the flow advances to the step (604).

Then, in the step (603), it is investigated whether or not the storage process is executable. This process is executed by the iPrint control unit 221 equipped in the device of transmission destination.

With respect to this process, similar to the process in the step (502) in the flowchart shown in FIG. 5, information of total number of pages to be printed is extracted based from the result in the step (402) shown in FIG. 4 and it is investigated whether or not the storage process is executable.

For example, in case of monochrome data of which the resolution is 600 dpi and the gradation is 1 bpp, since data size per one page becomes about 4 MB, the amount of "4 MB×number of pages" is treated as the data size, which is compared with free space capacity of the storage area, then it is judged whether or not the storage process is executable. The data size per one page sometimes changes according to the resolution, the gradation and the like.

Also, it is possible to reduce the data size by using an arbitrary encoding method and use that reduced sized data for a comparison with storage size. When it is judged that the storage process is executable, the present process is terminated upon describing information into the packets shown in FIG. 6.

Accordingly, similar to the above-mentioned case, the address 1001 of the device of storage destination, the address 1002 of the device of transmission source, the command 1003 indicating the storage search result, the storage location 1004 of the storage device equipped in the device of storage destination and the size 1005 of the storage location 1004 are described into these packets.

On the other hand, in the step (603), when it is judged that the storage process is not executable, since the storage process can not be executed in the concerned device, the flow returns to the step (602) again, and wait for a response from another device.

On the other hand, in the step (602), when it is judged that the response does not exist, the flow advances to the step (604), where it is confirmed whether or not a timeout occurs. When it is judged that the timeout occurs, also in this case, it is judged that the storage process is not executable, then the storage search is terminated.

On the other hand, when it is judged that the timeout does not occur in the step (604), the flow returns to the step (602) and the process is repeated.

Figure 9:
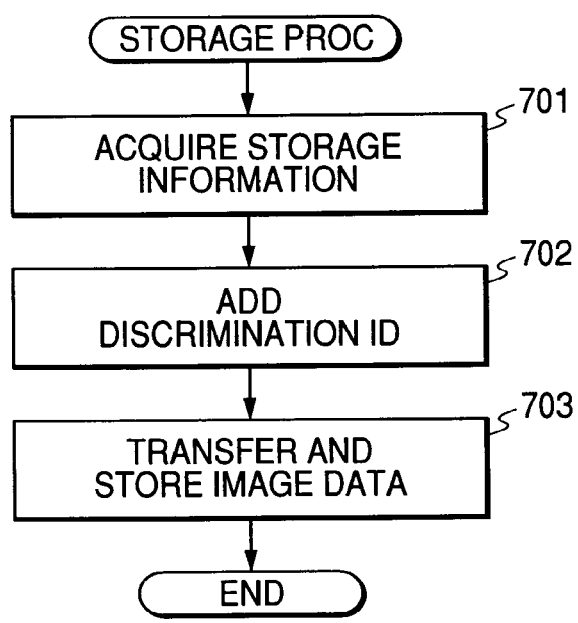
FIG. 9 is a flowchart showing an example of a fifth data processing procedure in the image processing system according to the present invention.

FIG. 9 is a flowchart showing an example of a fifth data processing procedure in the image processing system according to the present embodiment, and this procedure corresponds to a detailed procedure of the storage process in the step (406) shown in FIG. 4. Reference numerals (701) to (703) denote respective steps.

Figure 14:
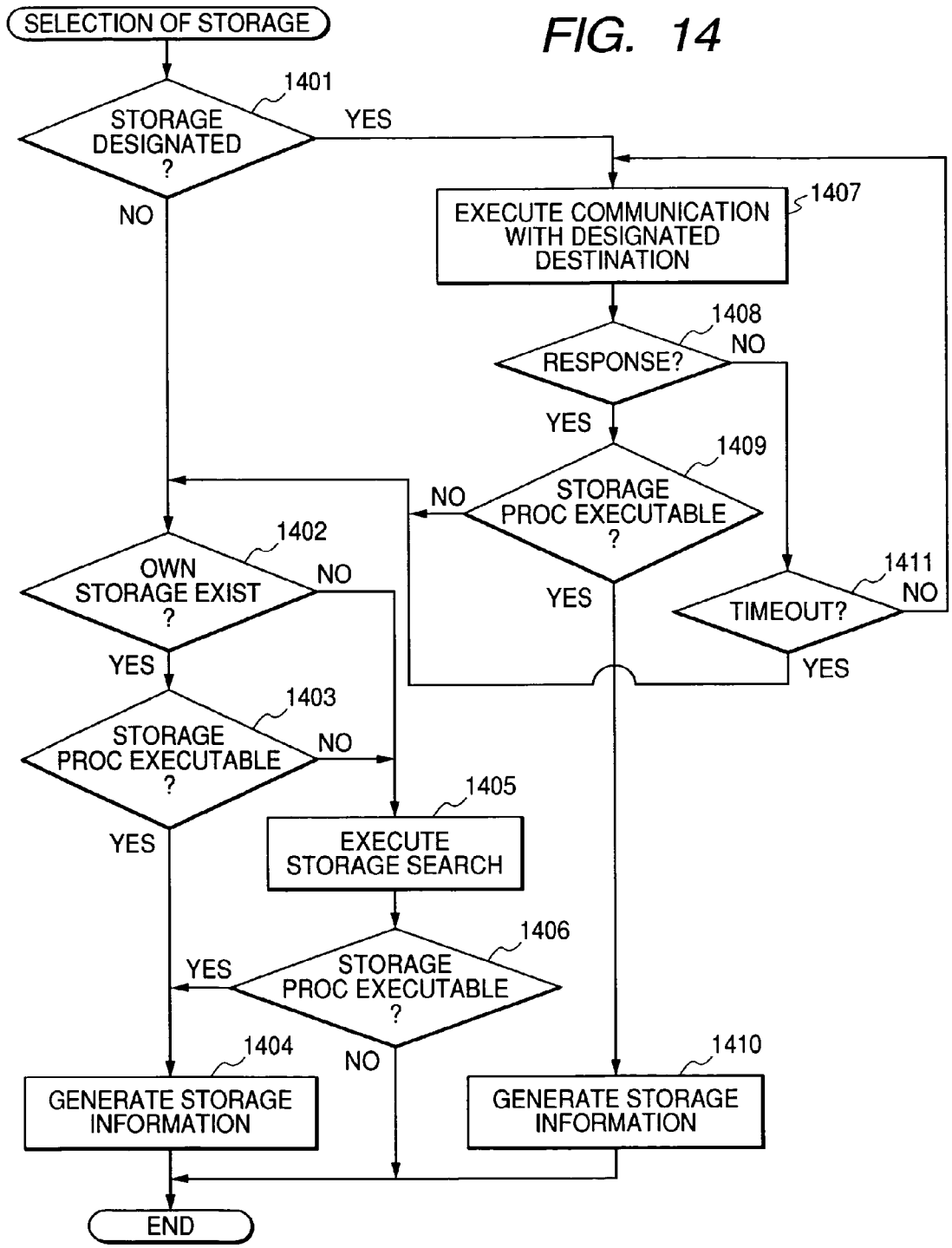
FIG. 14 is a flowchart showing an example of a eighth data processing procedure in the image processing system according to the present invention.

Initially, in the step (701), the storage information is acquired. As to the storage information, it is assumed as information to be generated as shown in FIG. 14 to be described later. Here, it is assumed that an address of the device of storage destination, an address of the device (printing device) of currently executing the PDL process, a storage location (directory) of the storage device equipped in the device of storage destination, a file name in case of storing image data into the directory and practical storage size of the storage device equipped in the device of storage destination are acquired.

Next, in the step (702), the address of the device of storage destination, the storage location of the storage device in the device of storage destination and a discrimination ID indicating the file name of the image data are added to the image data. This discrimination ID is a discrimination ID to be read by a scanner or the like in a copy process to be described later. By analyzing the discrimination ID, it is assumed that it becomes possible to specify and extract the image data stored in the device of storage destination, and the discrimination ID is added to the rendering image created in the step (404) shown in FIG. 4. As this discrimination ID, a barcode or the like may be used, and it is not especially stipulated.

Next, in the step (703), the image data is transferred and stored. In this case, on the basis of the information acquired in the step (701), image data, which is obtained by adding the discrimination ID in the step (702) to the rendering image created in the step (404), is transmitted to the device 120 of transmission destination from the storage device 113 equipped in the device 110 of transmission source through the network, and the transmitted image data is stored in the storage device 124 equipped in the device 120 of transmission destination and then the storage process is terminated. Next, the flow returns to the step (407), where the print process is executed.

<Copy Process>

Next, the copy process in the step (302) shown in FIG. 3 will be explained.

Figure 10:
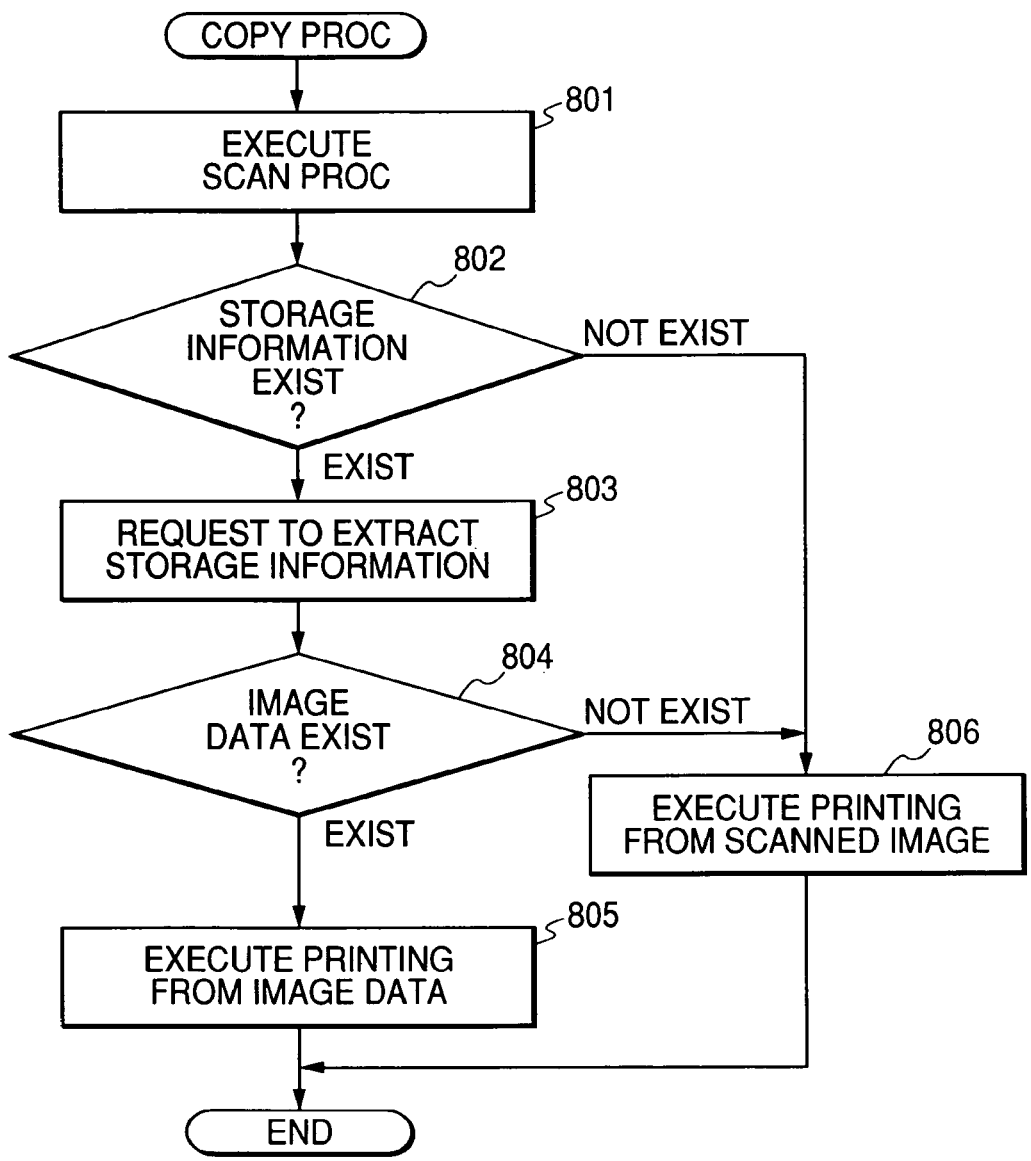
FIG. 10 is a flowchart showing an example of a sixth data processing procedure in the image processing system according to the present invention.

FIG. 10 is a flowchart showing an example of a sixth data processing procedure in the image processing system according to the present embodiment, and this procedure corresponds to a detailed procedure of the copy process in the step (302) shown in FIG. 3. Reference numerals (801) to (806) denote respective steps.

Initially, in the step (801), the print formed in the step (301) shown in FIG. 3 is treated as an original, which is scanned by the scanner 127 of the multifunctional device 120 shown in FIG. 2, and a scanned result is stored in the HDD 124 or the RAM 123 of the storage device shown in FIG. 1.

Next, in the step (802), it is investigated whether or not storage information is included in image data of the original obtained as a result of the scan executed in the step (801). This storage information indicates the discrimination ID added in the step (702) in the flowchart shown in FIG. 9, and presence/absence of the storage information is judged by the discrimination ID. When it is judged that the storage information exists, a flow advances to the step (803), and when it is judged that the storage information does not exist, the flow advances to the step (806).

Initially, an explanation when it was judged that the storage information exists in the step (802) will be given.

In the step (803), it is requested to extract the storage information. Information used for the extracting request is acquired based from the discrimination ID in the step (802), and the extracting request is executed by using packets shown in FIG. 11.

Figures 11, 12, 13:
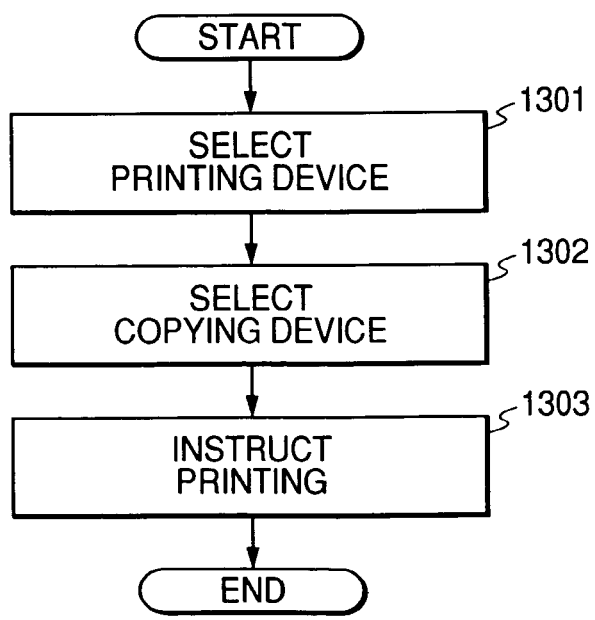
FIG. 11 is a view showing an example of packets generated by a multifunctional device shown in FIG. 1.
FIG. 12 is a view showing an example of packets received by the multifunctional device shown in FIG. 1.
FIG. 13 is a flowchart showing an example of a seventh data processing procedure in the image processing system according to the present invention.

FIG. 11 is a view showing an example of packets generated by a multifunctional device 120 shown in FIG. 1, and information, which is read from the discrimination ID, is described into the packets.

In FIG. 11, an address of the device of storage destination, which is read from the discrimination ID, is described into the packet of an address of transmission destination 1101, an address of the own device is described into the packet of an address of transmission source 1102, a command indicating a request for extracting the storage information is described into the packet of a command 1103, a storage location (directory) of the storage device equipped in the device of storage destination is read from the discrimination ID and is described into the packet of a storage location 1104 and a file name storing the storage location of the storage device equipped in the device of storage destination is read from the discrimination ID and is described into the packet of a file name 1105.

Then, on the basis of packets information shown in FIG. 11, it is requested to extract data accumulated in the storage device.

Initially, the packets information shown in FIG. 11 is transmitted to an address of the device of storage destination. In a case that a communication can be performed with the device of storage destination, for the request of extracting the storage information, the storage information returns to the own device. Information as shown in FIG. 12 are described into the returned packets.

FIG. 12 is a view showing an example of packets received by the multifunctional device 120 shown in FIG. 1.

In FIG. 12, an address of the device of storage destination is described into the packet of an address of transmission destination 1201, an address of the own device is described into the packet of an address of transmission source 1202, a command (extraction possible, extraction impossible) indicating a return value of the request for extracting the storage information is described into the packet of a command 1203, a storage location of the device of storage destination is described into the packet of a storage location 1204, a file name stored in the device of storage destination is described into the packet of a file name 1205 and a data format of the file stored in the device of storage destination is described into the packet of a data format 1206.

In a case that a communication can not be performed with the device of storage destination, it is assumed that the packets are returned in a state that "NULL" is described into the packets shown in FIG. 12.

Next, in the step (804), it is investigated whether or not image data exists on the basis of a result for the request of extracting the storage information in the step (803).

This investigation is executed because there is a case that the image data sometimes does not exist in the device of storage destination, in which the image data originally has to exist, by some reason. This case is judged by the command 1203 of the packet shown in FIG. 12.

When it is judged that the image data which can be extracted exists, the flow advances to the step (805), and when it is judged that the image data which can be extracted does not exist, the flow advances to the step (806).

Initially, a case of the step (805), that is, a case where the image data exists will be explained.

In the step (805), the image data is extracted from the device indicated by the address 1201 of the device of storage destination shown in FIG. 12. It is assumed that the image data is stored in the HDD 124 through the I/F unit 126 shown in FIG. 1. Thereafter, the printer engine 125 converts the image data stored in the HDD 124 into a video signal and causes the printing device to output the video signal as a visible image on a sheet.

On the other hand, when it is judged that the image data does not exist in the step (804), the data scanned in the step (801) is developed on the HDD 124 shown in FIG. 1 as image data similar to an ordinary copy process, and the printer engine 125 converts the image data stored in the HDD 124 into the video signal and causes the printing device to output the video signal as a visible image on a sheet.

Next, an example of a data processing procedure by the host computer being the most characteristic data processing procedure of the present embodiment will be explained.

FIG. 13 is a flowchart showing an example of a seventh data processing procedure in the image processing system according to the present embodiment, and this procedure corresponds to the data processing procedure executed in the host computer 101 shown in FIG. 1. Reference numerals (1301) to (1303) denote respective steps.

Initially, in the step (1301), in case of instructing the print of data targeted to be printed generated by the application software, a printing device which starts, from now, the print of an image based on the data is selected at the printer driver 202 shown in FIG. 2. Here, it is assumed that the printing device 110 is selected.

Next, in the step (1302), a copying device (a device which has a scanner and a printer and can execute a copy process using the scanner and the printer) used for storing the data targeted to be printed is selected (storage selection) at the printer driver 202 shown in FIG. 2 similar to the case in the step (1301). Since the selection in this case is a selection of the storage device used for storing the print data in reusable, it is not required to be a copying device, however when the storage device having a copying function is selected, an original, to which the discrimination ID is added, is read by the scanning function, and when the corresponded image data is extracted and printed by a printing function, the image data can be extracted and printed without passing through a network. Therefore, as compared with a case of storing the image data in another device, a process of a data transfer request passing through the network is omitted, and an increase of traffic of the network can be prevented and a high quality copying process based on original print data can be executed in a remarkable short time.

With respect to the copying device to be used here, the copying device often used by the user is assumed to be selected among candidates of plural storage devices previously registered in the host computer 101.

Next, in the step (1303), the user instructs a print process through the printer driver 202 shown in FIG. 2. In this case, it is assumed to indicate that the print data is transmitted to the printing device 110 shown in FIG. 1 from the host computer 101 shown in FIG. 1. Simultaneously, the print data is transmitted, so as to store the print data in the copying device (storage) selected in the step (1302), to the copying device (storage).

Accordingly, the printing device 110, which received the print data, executes a print process in accordance with the PDL process in FIG. 4 explained in the foregoing.

FIG. 14 is a flowchart showing an example of a eighth data processing procedure in the image processing system according to the present embodiment, and this procedure corresponds to a detailed procedure of the storage selection process in the step (1302) shown in FIG. 13. Reference numerals (1401) to (1411) denote respective steps.

Initially, in the step (1401), it is investigated whether or not a storage destination is designated. This designation of the storage destination indicates the designation among plural storage devices of designated candidates, which were previously registered, based on a manual operation by the user at the host computer 101. At this time, the order of priority is given to each of the plural candidates, and it is preferable that the candidates are to be displayed from the high-ranking candidate in accordance with the order of priority. And, the order of priority is assigned so that the storage device having a copying function becomes a high-ranking candidate. Further, it is preferable that such the storage device having large capacity becomes a more high-rank in the order of priority. When it is judged that the storage destination is not designated, a flow advances to the step (1402), and when it is judged that the storage destination is designated, the flow advances to the step (1407).

Initially, a case that the storage destination is designated will be explained.

In the step (1407), a communication with the device designated by the storage designation is executed by using the packets shown in FIG. 8.

An address of the device (in this case, the multifunctional device 120 is assumed to be designated) of storage designation is automatically designated for the packet 901, an address of the host computer 101 is designated for the packet 902 and a command of storage selection is described into the packet 903.

Then, in the step (1408), it is investigated whether or not a response in the step (1407) exists. When it is judged that the response exists, the flow advances to the step (1409), and when it is judged that the response does not exist, the flow advances to the step (1411).

Next, in the step (1409), it is investigated whether or not the storage process is executable. This process is executed at the iPrint control unit 221 in the device of transmission destination. With respect this process, similar to the process in the step (502) in the flowchart shown in FIG. 5, information of total number of pages in case of printing an image based on the print data is extracted and it is investigated whether or not the storage process is executable.

For example, in case of monochrome data of which the resolution is 600 dpi and the gradation is 1 bpp, since data size per one page becomes about 4 MB, the amount of "4 MB×number of pages" is treated as the data size, which is compared with free space capacity of the storage area, then it is judged whether or not the storage process is executable. The data size per one page sometimes changes according to the resolution, the gradation and the like. Also, it is possible to reduce the data size by using an arbitrary encoding method and use that reduced sized data for a comparison with storage size. When it is judged that the storage process is executable, information is described into the packets shown in FIG. 6.

Here, an address of the device of storage destination is described into the packet 1001, an address of the device of transmission source is described into the packet 1002, a command indicating a result of storage search is described into the packet 1003, a storage location of the storage device equipped in the device of storage destination is described into the packet 1004 and a size of the storage location 1004 is described into the packet 1005.

Then, in the step (1409), when it is judged that the storage process is executable, the flow advances to the step (1410), where storage information is generated, and a process of the storage selection is terminated.

On the other hand, in the step (1409), when it is judged that the storage process is not executable, since the storage process can not be executed to the designated device, the flow advances to the step (1402).

In the step (1408), when it is judged that the response does not exist, the flow advances to the step (1411), where it is investigated whether or not the timeout occurs. When it is judged that the timeout does not occur, the flow returns to the step (1407), and processes after the step (1407) are executed similar to the above-mentioned case.

On the other hand, in the step (1411), when it is judged that the timeout occurs, it is judged that the storage process at the designated device can not be executed, and the flow advances to the step (1402).

On the other hand, in the step (1402), it is judged whether or not a storage location exists in the HDD 104 of the host computer 101.

In the step (1402), when it is judged that the storage location of executing the storage process exits in the HDD 104 of the host computer 101, the flow advances to (1403).

In the step (1402), when it is judged that the storage location of executing the storage process does not exist in the host computer 101, the flow advances to the step (1405), and the storage search is executed.

Hereinafter, a case that the storage location exists in the host computer 101 in the step (1402) will be explained.

The flow advances to the step (1403), and information of total number of pages in case of printing an image based on the print data is extracted, and it is investigated whether or not the storage process is executable. For example, in case of monochrome data of which the resolution is 600 dpi and the gradation is 1 bpp, since data size per one page becomes about 4 MB, the amount of "4 MB×number of pages" is treated as the data size, which is compared with free space capacity of the storage area, then it is judged whether or not the storage process is executable. The data size per one page sometimes changes according to the resolution, the gradation and the like. Also, it is possible to reduce the data size by using an arbitrary encoding method and use that reduced sized data for a comparison with storage size.

On the other hand, in the step (1403), when it is judged that the storage process is executable in the host computer 101, the flow advances to the step (1404).

In the step (1403), when it is judged that the storage process is not executable in the host computer 101, the flow advances to the step (1405), and the storage search is executed.

Next, the storage search in the step (1405) will be explained.

This storage search is executed by the same method as that in the iPrint control units 211 and 221 shown in the above-mentioned FIG. 2. The detail of the storage search is similar to that in FIG. 6.

Then, in the step (1406), when it is judged that the storage process is executable, the flow returns to the step (1404), and storage information is generated and then the process is terminated.

According to the above-mentioned embodiment, when an image is printed by the printing device, it becomes possible that the same image data is directly read from the storage means of the image processing device without passing through a network and is output as an image after terminating a print process by transferring image data to be printed to both a printing device and the image processing device having a reading function and a printing function as a device including a storage function only by designating the image processing device having a storing means as a storage destination of the image to be printed, thereby the network transfer processing load given until the same image data is output again is released and the same image data can be output in a remarkable short time.

It is investigated whether or not the storage means can store print image data, and when it is judged that the print image data can be stored, since the image data is transferred, a useless image data transfer process can be restricted and the network transfer processing load can be reduced.

If the image data to be stored in the storage means is assumed as data of developed into intermediate data from data of page description language, it becomes possible to reduce the data amount and to cope with various kinds of printing devices. Further, if the image data to be stored is assumed as data of developed into image data from the intermediate data (in accordance with necessity, the data may be compressed thereafter), although the data amount increases, it becomes possible to cope with more various printing devices. Of course, if the image data is treated as data of page description language as it is, since data of extremely little amount is realized, such the image data may be adopted.

With respect to the designation of storage destination, if it is to be designated by an operator at the host computer through the printer driver, the designation can be executed in the course of an operation when instructing a print process. Thereby the working efficiency is improved.

In the image processing device having a scanner function and a printer function, by reading the discrimination ID added to image data of an original, it becomes possible to read out the stored image data (image corresponding to the read original) easily and to execute the print process without executing a complex operation for the search.

Another Embodiment

In the above-mentioned first embodiment, as data to which a storage process is executed, a case of image data developed from data of intermediate language was exemplified. However, the data to which the storage process is executed may be the data of intermediate language. In this case, a case of realizing an iPrint process after rendering the image data at a device by which the storage process was executed is allowed. That is, in case of developed image data, a print process can be executed at any printing device, however the data amount increases. On the other hand, if in case of intermediate language data, the data amount decreases as compared with the developed image data. The intermediate language data can not be sometimes interpreted by some devices, however since a format of the intermediate language data does not depend on the kind of PDL, the number of applicable printing devices becomes large as compared with a case where the image data is treated as data of PDL as it is.

With respect to selection of the device which executes the storage process, a case of selecting the device due to the kind of PDL data monochrome or color is allowed. In this case, plural candidates of storage devices used for color or monochrome are respectively registered in the host computer 101, and the storage device is allowed to be selected from the candidates corresponding to the respective purposes according to a fact that print data is monochrome or color. Further, in the above selection, the order of priority (for example, the order of priority of a device having a copying function is raised) is given, and it is allowed that the storage device is automatically selected in accordance with a state that the print data is monochrome or color, the order of priority and the condition of the storage device being the candidate at present.

In the above-mentioned first embodiment, as to selection of the device which executes the storage process, a case that a copying device is selected by an operation of a user from the host computer or a searching process was exemplified. However, devices often used in the iPrint process are statistically stored, and a case that a device to be used with high frequency is automatically selected among the stored devices or the devices are displayed according to the order of priority to be selected is allowed.

In the above-mentioned first embodiment, a case that a PDL processing function is equipped at a side of a multifunctional device being the storage device was exemplified. However it is not required to equip the PDL processing function. In this case, print data is to be transferred after reforming to intermediate language data or image data developed from the intermediate language data at a side of the host computer 101.

In the above-mentioned first embodiment, in case of executing a storage search, a device most quickly responding in a communication of Broadcast was preferentially treated as the storage device targeted to be selected. However, when plural devices respond at the same time, a case of selecting the storage device among those plural devices is allowed.

In the above-mentioned first embodiment, it was assumed that the host computer 101 transmits the print data to the storage device. However, it is allowed that, after selecting the storage device, information for specifying a storage destination in the storage device and the print data are transmitted to a printing device by which a print process and transmission to the storage device are executed. In this case, the printing device recognizes that the received information is to be printed and stored in that storage device, executes a print process by adding image data indicating a discrimination ID used for extracting information from the designated storage device to image data based on the that print data and transmits the print data to the designated storage device so as to store the print data.

Information indicating a storage destination at the storage device, information specifying the printing device and the print data are transmitted to the selected storage device, which is caused to store the print data and transfer the print data to the designated printing device, and a print process may be executed at that printing device. In this case, the storage device, which received the above-mentioned information and print data, stores the print data in accordance with the information indicating the storage destination, transfers the print data in accordance with the information specifying the printing device and causes the printing device to execute the print process. The printing device prints an image based on the print data to which the discrimination ID used for extracting the print data from the storage device was added.

According to these methods, since the host computer 101 does not execute twice transmissions such as transmission to the printing device and transmission to the storage device but execute only once transmission to any of the printing device and storage device, the load can be reduced.

In the above embodiment, with respect to adding of the discrimination ID, it is allowed that image data indicating the discrimination ID is generated at the printing device in accordance with the received storage information and that image data is added or image data indicating the discrimination ID is previously generated at the host computer and then that image data is transmitted after adding it to the print data.

According to the above-mentioned embodiment, in a system utilizing the above-mentioned iPrint, by preferentially designating a device which can execute a copying process as a device of storage destination at the host computer previously, the load of data transfer in reading out storage data when a copy process is executed can be avoided and a more speedy copying process can be executed.

As to designation of the storage device, besides the above examples, the order of priority of the storage device which is located in a state that a physical distance between the storage device and the host computer, which gives a printing instruction, is short, that is, the order of priority of the storage device which is located on a position near the host computer may be raised. This is because the distance moved by an operator is resulted in only a short distance in a case that the host computer is usually used by the operator.

Also, the order of priority of the storage device which is in a state that a logical distance on a network between the storage device and the host computer is short, that is, the order of priority of the storage device which passes through routers, of which number is as little as possible until image data which was output from the host computer reaches the storage device, may be raised. This is because the load of traffic in the network is more reduced.

Further, without standardizing the host computer in this manner, a physical location or a logical location between the printing device which executes a print process and the storage device may be considered. This is because the printing device near a place, where the operator is usually present, is sometimes designated.

Otherwise, the order of priority of the storage device having a large free space capacity may be raised.

In case of registering a candidate of the storage device, when an access right is set for the storage device, it is needless to say that the storage device which can be used by a user (an access right of a user is registered) is selected and registered. In case of using such the storage device, user information is also transferred to the storage device so as to execute the user certification. In case of extracting image data from the storage device, an operation for the user certification is executed or the user certification is executed in a manner that user information is included in the discrimination ID and such the discrimination ID is used.

It is allowed that the storage device is designated by the most convenient method of determining the order of priority for respective operators by suitably combining the foregoing examples or selecting and canceling the foregoing examples. In this case, it is needless to say that the storage devices may be automatically designated from the one of which the order of priority is in a higher rank or the display order of priority may be controlled in case of manually designating by the operator.

As to Programs for Carrying Out the Embodiments

Hereinafter, the construction of data processing programs which can be read by an image processing system including a host computer, a printing device and a multifunctional device according to the present embodiment will be explained with reference to a memory map shown in FIG. 15.

FIG. 15 is a view for explaining the memory map of a storage medium for storing various data processing programs which can be read by the image processing system including the host computer, the printing device and the multifunctional device according to the present invention.

Although they are not shown, information for managing a program group to be stored in the storage medium, for example, version information and information in which a creator or the like is stored and depending on an OS (Operating System) or the like at a side of reading out programs, for example, an icon or the like for discriminatingly displaying programs are also sometimes stored.

Further, data subordinate to the various programs is managed by the above-mentioned directory. In a case that a program used for installing the various programs into a computer or a program to be installed is compressed, a program used for extraction is also sometimes stored.

Functions shown in FIGS. 3, 4, 5, 7, 9, 10, 13 and 14 in the present embodiment may be executed by a host computer according to programs installed from external devices. In this case, the present invention is applicable in a case that an information group including programs is supplied to an output device by a storage medium such as a CD-ROM, a flash memory, an FD (floppy disk) or the like, or from an external storage medium through a network. At this time, it is assumed that a printer or a scanner is suitably connected to the host computer.

As mentioned above, it is needless to say that an object of the present invention can be achieved in a case where a storage medium recording the program codes of software for realizing the functions of the above-mentioned embodiments is supplied to a system or an apparatus and then a computer (or CPU or MPU) in the system or the apparatus reads and executes the program codes stored in the storage medium.

In this case, the program codes themselves read from the storage medium realize the new functions of the present invention, and the storage medium storing such the program codes constitutes the present invention.

Therefore, any form of a program, such as an object code, a program executed by an interpreter, script data or the like to be supplied to an OS is available without inquiring a program form if having the function of a program.

As the storage medium for supplying the programs, for example, a flexible disk, a hard disk, an optical disk, a magnetooptical disk, an MO, a CD-ROM, a CD-R, a CD-RW, a magnetic tape, a nonvolatile memory card, a ROM, a DVD or the like can be used.

In this case, the program codes themselves read from the storage medium realize the functions of the above-mentioned embodiments, and the storage medium storing such the program codes constitutes the present invention.

As another method of supplying the programs, which can be also supplied by downloading the computer program itself of the present invention or a file which is compressed and includes automatic installing function into the storage medium such as a hard disk or the like from a homepage by connecting to the homepage on an internet by using browser of a client computer. Further, the supplying of the programs can be also realized by dividing program codes constituting the program of the present invention into a plurality of files and downloading the respective files from different homepages. That is, a WWW server, a ftp (file transfer protocol) server or the like, which makes the plural users to download program files for realizing the functional process of the present invention by the computer, is also included in appended claims of the present invention.

The programs of the present invention which are encoded and stored in the storage media such as the CD-ROMs or the like are distributed to users, and key-information for solving the encoded programs is made to be downloaded for the specific user who clears a predetermined condition from the homepage through the internet, and that user executes the encoded programs by using the key-information to install the programs into the computer. Thereby, the supplying of the programs can be also realized.

It is needless to say that the present invention also includes not only a case where the functions of the above-mentioned embodiments are realized by the execution of the program codes read by the computer, but also a case where an OS (operating system) or the like functioning on the computer executes all the process or a part thereof according to the instructions of the program codes, thereby realizing the functions of the above-mentioned embodiments.

Further, it is needless to say that the present invention includes a case where the program codes read from the storage medium are once written in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above-mentioned embodiments.

The present invention is not limited to the above-mentioned embodiments, but can be modified in various manners (including an organic combination of embodiments) on the basis of the spirit of the present invention, and the various modifications are not excluded from the scope of the present invention.

Although various examples and embodiments of the present invention have been indicated and explained, it is needless to say that the spirit and scope of the present invention are not limited to a specific explanation in the present specifications for the person skilled in the art, and various modifications are possible within the scope of the appended claims of the present invention.

This application claims priority from Japanese Patent Application No. 2004-259907 filed on 7 Sep. 2004, which is hereby incorporated by reference herein.

What is claimed is:

1. A network system comprising:
a host computer;
a storing apparatus; and
a printing apparatus,
wherein the host computer comprises:
a first communication interface; and
a first processor configured to execute:
a generating task that generates data to be printed by the printing apparatus;
a determining task that determines whether or not to store the data in the storing apparatus for reprinting; and
a transmitting task that controls the communication interface to transmit the data to which storage information has been added to both the printing apparatus and the storing apparatus, based on the determination made by the determining task, the storage information including an address of the storing apparatus, a directory into which the data is stored, and a file name in a case where the data is stored into the directory,
wherein the storing apparatus stores the data transmitted from the host computer based on the storage information added to the data transmitted from the host computer, and
wherein the printing apparatus comprises:
a printer;
a reader;
an input interface;
a second communication interface; and
a second processor configured to execute:
a printing task that controls the printer to print on a sheet based on the data transmitted from the host computer, including the storage information added to the data transmitted from the host computer;
an inputting task that receives an instruction of the reprinting input to the input interface;
a reading task that controls the reader to read an original image on the sheet;
a sending task that controls the second interface to send a data obtaining request to the storing apparatus based on the instruction received by the inputting task and the storage information extracted from the original image read by the reading task, without sending the data obtaining request to the host computer; and
a reprint task that controls the printer to reprint the data obtained from the storing apparatus, according to the instruction received by the inputting task.

2. The network system according to claim 1, wherein the generating task generates the data using a printer driver.

3. The network system according to claim 1, wherein the determining task determines whether or not to store the data in the storing apparatus for the reprinting, based on an instruction of an operator received by the input interface.

4. The network system according to claim 1, wherein:
the storage information further includes a discrimination ID, and
the reprint task requests the data corresponding to the discrimination ID, to the storing apparatus.

5. The network system according to claim 1, wherein the first processor is further configured to execute a selecting task that accepts a selection of the storing apparatus to store the data for the reprinting.

6. A controlling method for a network system comprising a host computer, a storing apparatus, and a printing apparatus, the host computer including a first processor and a first communication interface, and the printing apparatus including a printer, a reader, an input interface, a second communication interface, and a second processor, the method comprising:
a generating step of generating, using the first processor, data to be printed by the printing apparatus;
a determining step of determining, using the first processor, whether or not to store the data in the storing apparatus for reprinting;
a transmitting step of transmitting, using the first communication interface, the data to which storage information has been added to both the printing apparatus and the storing apparatus, based on the determination made in the determining step, the storage information including an address of the storing apparatus, a directory into which the data is stored, and a file name in a case where the data is stored into the directory;
a storing step of storing in the storing apparatus the data transmitted from the host computer based on the storage information added to the data transmitted from the host computer;
a printing step of printing, using the printer, on a sheet based on the data transmitted from the host computer, including the storage information added to the data transmitted from the host computer;
an inputting step of receiving an instruction of the reprinting input to the input interface;
a reading step of reading, using the reader, an original image on the sheet;
a sending step of sending, using the second communication interface, a data obtaining request to the storing apparatus based on the instruction received in the inputting step and the storage information extracted from the original image read by the reading step, without sending the data obtaining request to the host computer; and a reprint step of reprinting the data obtained from the storing apparatus, according to the instruction input in the inputting step.

\* \* \* \* \*